Feb. 9, 1960

G. R. HOLTON ET AL 2,924,268

TIRE TRUEING DEVICE

Filed Aug. 16, 1956

Gresham R. Holton
Herbert R. Burrough
INVENTORS

Feb. 9, 1960   G. R. HOLTON ET AL   2,924,268
TIRE TRUEING DEVICE
Filed Aug. 16, 1956   2 Sheets-Sheet 2
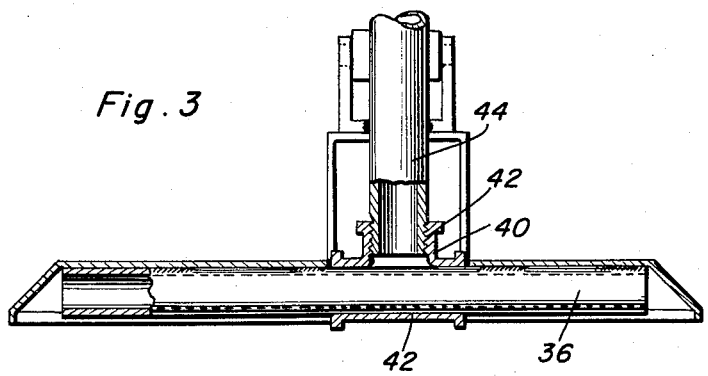
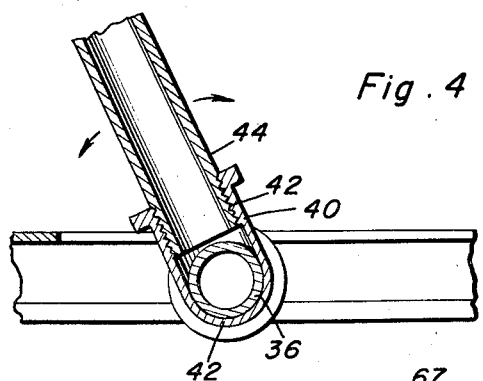
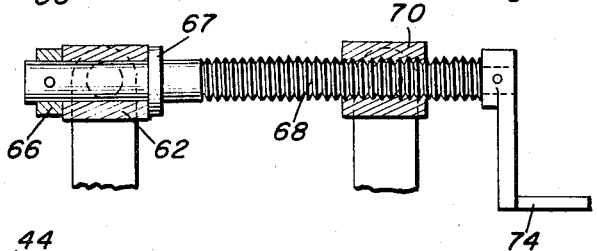
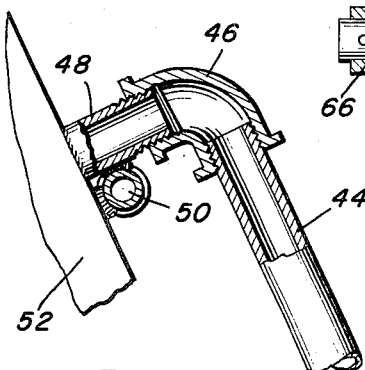
Gresham R. Holton
Herbert R. Burrough
INVENTORS ID United States Patent Office 2,924,268
Patented Feb. 9, 1960

2,924,268

TIRE TRUEING DEVICE

Gresham R. Holton and Herbert R. Burrough,
Antlers, Okla.

Application August 16, 1956, Serial No. 604,382

2 Claims. (Cl. 157—13)

This invention relates to an automotive wheel trueing device and has for its principal object the provision of means which may be used for trueing tires without demounting either the tire or wheel from an automobile.

Due to the rapid change in construction of automobile tires from cotton cord to rayon and nylon cord, it has been found that a great number of tires stretch out of round due to the stretching of rayon and nylon cords, which stretching was not calculated during the manufacture of these tires. Due to these conditions it is often necessary to true many tires after a few miles of use in order to make them safe to drive and run smoothly. Therefore, the present invention provides means which will easily and accurately remove the proper amount of material from the tire tread to accurately center the tread on the tire.

A further object of the invention resides in the provision of a machine which can be easily transported from one location to another so that it is ready for use as soon as the wheel of an automobile has been put in the position where it can be safely rotated.

These, together with the ancillary objects which will become apparent as the following description proceeds, are attained by this tire trueing machine, a preferred embodiment of which has been illustrated in the accompanying drawings, by way of example only, wherein:

Figure 3 is an enlarged sectional detail view as taken along the plane of line 3—3 in Figure 1 illustrating the pivotal mounting for the pipe carrying the motor which drives the abrading means;

Figure 4 is an enlarged sectional detail view further illustrating the construction of the pivotal mounting for the pipe;

Figure 5 is an enlarged sectional detail view as taken along the planes of line 5—5 in Figure 2 illustrating the construction of the operating handle and the means for attaching the motor driving the abrading means to the pipe; and Figure 6 is an enlarged sectional detail view illustrating the adjusting means for the pipe.

Figure 1:
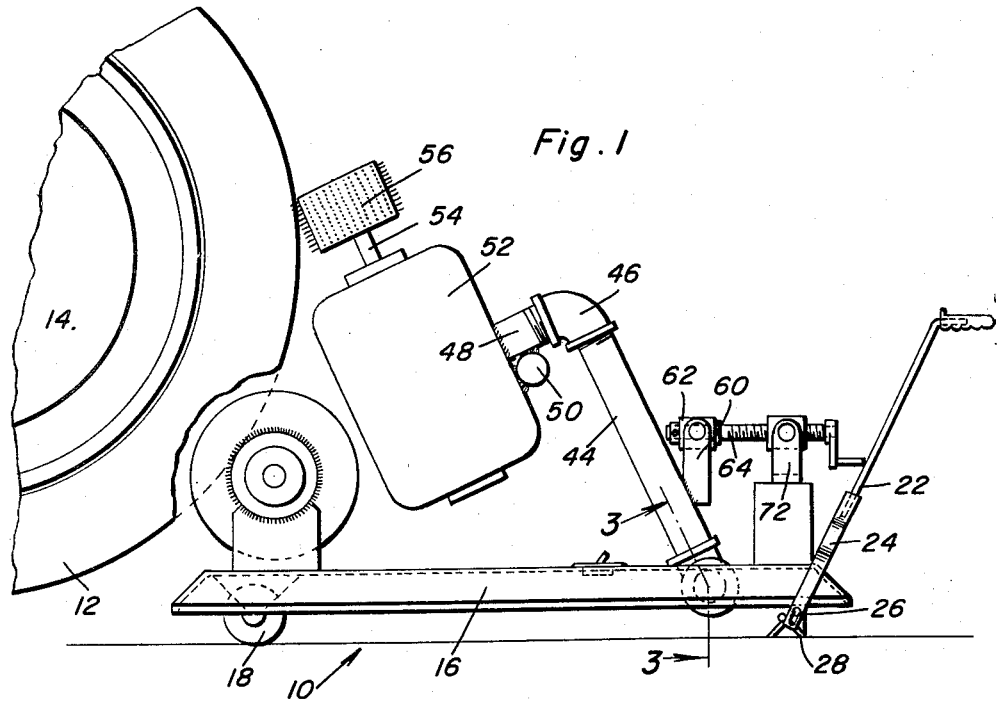
Figure 1 is a side elevational view of the tire trueing machine comprising the present invention shown operatively associated with a wheel for driving and trueing the wheel.
Figure 2:
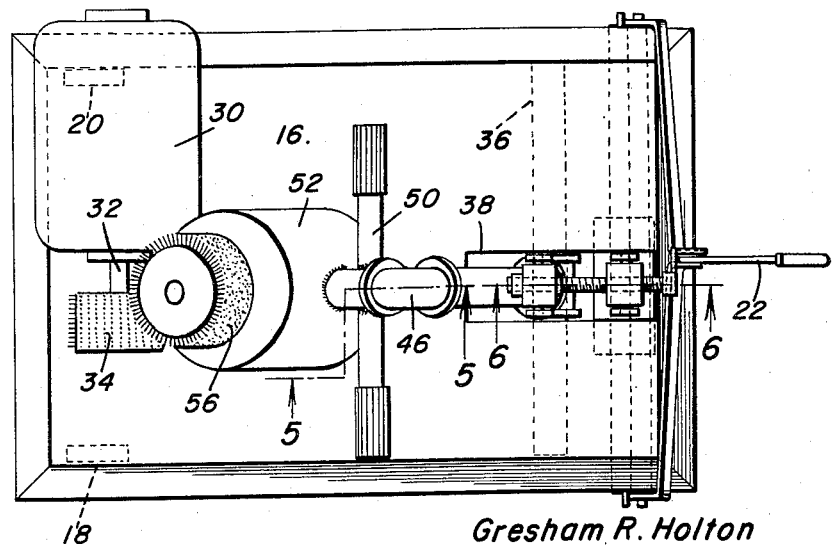
Figure 2 is a plan view of the invention.

With continuing reference to the accompanying drawings wherein like reference numerals designate similar parts throughout the various views, reference numeral 10 generally designates the tire trueing machine comprising the present invention. This tire trueing machine is adapted to true a tire 12 mounted on a wheel 14 without necessitating the removal of the tire 12 from the wheel 14 or the removal of the wheel from the vehicle. All that is necessary is to provide means for raising the wheel above the level of the ground supporting the automobile or other vehicle so that the tire and wheel may be readily rotated. The tire trueing device 10 includes a frame 16 having a pair of wheels 18 and 20 mounted thereon. The wheels 18 and 20 permit the ready transportation of the tire trueing machine from one location to another. A handle 22 is provided and is insertible into a handle lever 24 which is pinned as at 26 in any suitable manner to an angled shaped support 28 carried by the base. This handle may be used for raising the angled support 28 above the ground and then guiding the tire trueing machine 10 to any desired location.

Mounted along one side and to the front of the base or frame 16 is a motor 30 which drives a shaft 32 on which a tack rasp 34 is positioned. This tack rasp 34 is adapted to engage the tread of a tire to rotate the wheel 14.

An axle 36 formed of pipe or any other suitable material is secured to the frame 16. A slot or opening 38 is formed in the frame 16. A T coupling 40 is rotatably mounted by means of its tubular portion 42 about the axle 36 and has its threaded neck portion 42 extending upwardly through the opening or slot 38. Threadedly fixedly secured to the T coupling 40 is the lower end of a pipe 44. The pipe 44 has an elbow 46 secured thereto which is internally threaded. A nipple 48 is threadedly adjustably secured to the elbow 46 and has welded thereto a handle 50 to turn said nipple within said elbow. Further, welded to the handle 50 and to the nipple 48 is a motor 52 which drives a shaft 54 on which another tack rasp 56 is mounted, the tack rasp 56 being for the purpose of abrading and trueing the tire 12. In order to move the pipe 44 toward and away from the tire there is provided a fitting 60 welded or otherwise fixedly secured to the pipe 44 which carries a tubular fitting 62 through which an adjusting shaft 64 extends. The adjusting shaft is pinned to a collar 66 mounted thereon which engages the fitting 62. Another collar 67 is also mounted on the adjusting shaft 64. The adjusting shaft is threaded as at 68 and is threadedly engaged in another fitting 70 carried by a support 72 mounted on the base. A handle 74 is provided for rotating the adjusting shaft 64.

In operation, the trueing machine is wheeled up to a tire and the tack rasp 34 is used to rotate the tire. Then, through adjustment of the adjusting shaft 64 by operating the handle 50 the abrading tire tack rasp 56 may be used to true the tire.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tire trueing machine comprising a wheeled frame having a longitudinal and a transverse axis, a motor mounted on said frame adjacent to one end thereof and having its driveshaft extending parallel to said transverse axis, a friction element fixed to said driveshaft for driving engagement with a tire, a support post pivotally mounted at its lower end to said frame adjacent the opposite end thereof for rotation about a horizontal axis parallel to said transverse axis, means on said frame engaging said support post for adjustably holding the same at a desired angle relative to said frame, an elbow rigid with the upper end of said support post terminating in an internally threaded end portion having its axis disposed at right angles to the axis of said support post, a second motor, a nipple rigid with said second motor having an externally threaded end portion received in said internally threaded end portion of the elbow simultaneously securing said second motor to the support post and journalling the second motor for swinging movement about the axis of said nipple, said second motor having a driveshaft projecting upwardly therefrom substantially at right angles to said nipple and having an abrading member secured thereto.

2. A tire trueing machine comprising a wheeled frame having a longitudinal and a transverse axis, a motor mounted on said frame adjacent to one end thereof and having its driveshaft extending parallel to said transverse axis, a friction element fixed to said driveshaft for driving engagement with a tire, a support post pivotally mounted at its lower end to said frame adjacent the opposite end thereof for rotation about a horizontal axis parallel to said transverse axis, means on said frame engaging said support post for adjustably holding the same at a desired angle relative to said frame, an elbow rigid with the upper end of said support post terminating in an internally threaded end portion having its axis disposed at right angles to the axis of said support post, a second motor, a nipple rigid with said second motor having an externally threaded end portion received in said internally threaded end portion of the elbow simultaneously securing said second motor to the support post and journalling the second motor for swinging movement about the axis of said nipple, said second motor having a driveshaft projecting upwardly therefrom substantially at right angles to said nipple and having an abrading member secured thereto, an elongate handle member rigidly affixed to said second motor at the juncture thereof with said nipple and extending at right angles thereto transverse to said driveshaft of the second motor whereby the second motor may be swung manually about the axis of said nipple.

References Cited in the file of this patent

UNITED STATES PATENTS

| | | |
|---|---|---|
| 1,417,722 | Ehrenfeld et al. | May 30, 1922 |
| 2,366,685 | Chambers | Jan. 2, 1945 |
| 2,751,979 | Holland | June 26, 1956 |
| 2,765,845 | Bullis | Oct. 9, 1956 |